CLINTON & MUNSON.
Horse Rake.
No. 54,862.
Patented May 22, 1866.
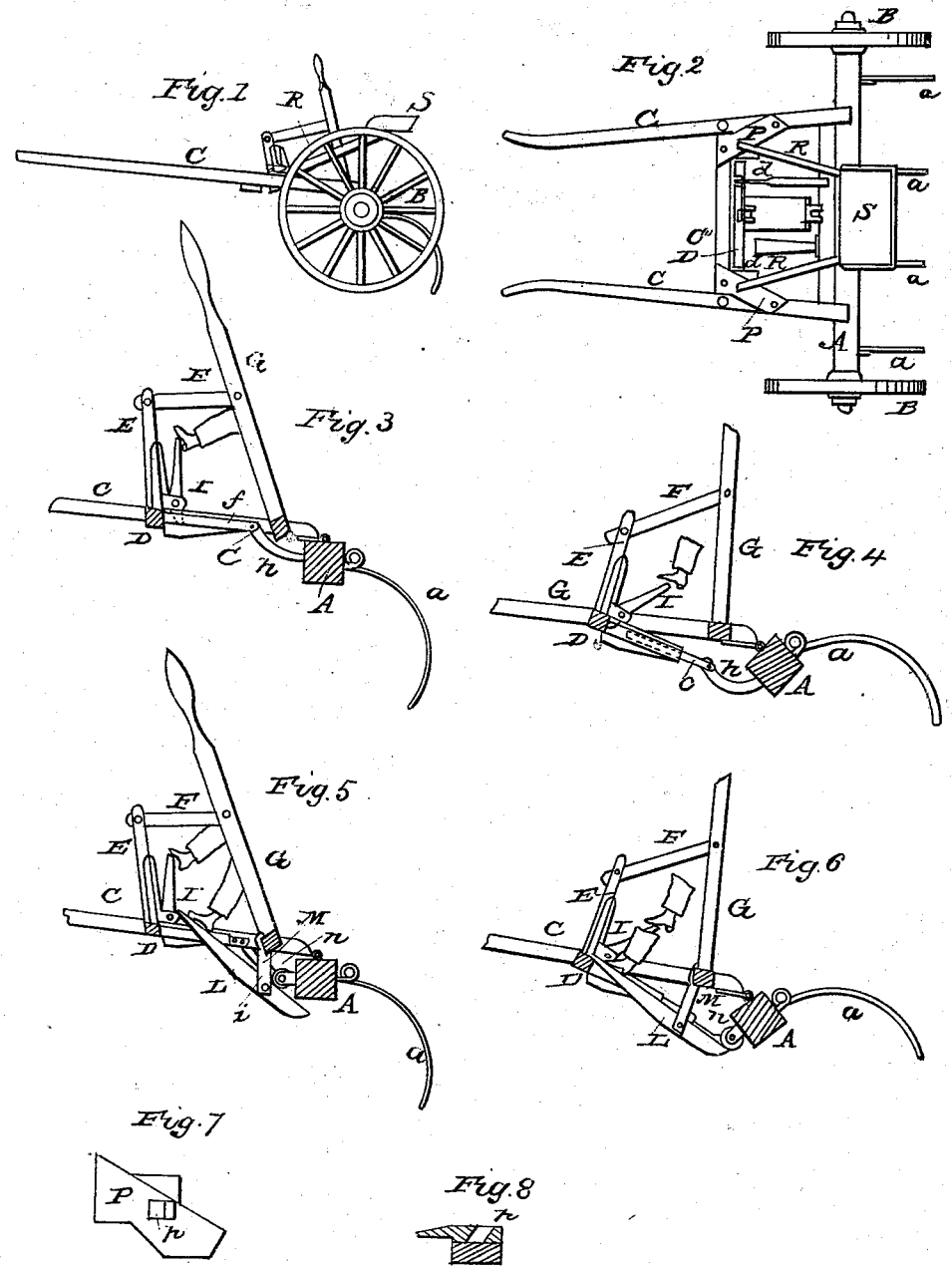

UNITED STATES PATENT OFFICE.

LYMAN CLINTON AND EZRA S. MUNSON, OF NORTH HAVEN, CONNECTICUT.

IMPROVEMENT IN HORSE-RAKES.

Specification forming part of Letters Patent No. 54,862, dated May 22, 1866.

*To all whom it may concern:*

Be it known that we, LYMAN CLINTON and EZRA S. MUNSON, of North Haven, in the county of New Haven and State of Connecticut, have invented a new and useful Improvement in Horse-Rakes; and we do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a top view; Figs. 3 to 8, inclusive, detached views to illustrate the operation of our invention.

Our invention relates to an improvement in common horse-rakes, whereby the rakes may be operated entirely by the feet of the driver.

To enable others skilled in the art to construct and use our improvement, we will proceed to describe the same, as illustrated in the accompanying drawings.

A is the axle, supported at either end by wheels B B, having teeth $a$ $a$ attached thereto in the usual manner, and a pair of thills, C, attached to the axle in the usual manner for operating the rake. The said thills are hinged to the axle so as to allow it to be turned as from the position in Fig. 3 to that in Fig. 4. Between the two thills and in proper bearings $d$ is fixed a shaft, D, to which is fixed a lever, E, connected by a rod, F, to a hand-lever, G, by the movement of which lever G from the position in Fig. 3 to that in Fig. 4, the teeth $a$ of the rake will be raised, or by the return of the lever G the teeth will be dropped, as in Fig. 3. This is a common and well-known device. Many times it is inconvenient to use the hand to thus operate the rake through the lever G.

In order to make the operation of the rake entirely independent of the hand we attach a foot-lever, I, directly or indirectly to the shaft D, which, by pressing upon, as seen in Fig. 3, turns down and holds the teeth in that position, or by moving the lever as from the position in Fig. 3 to that in Fig. 4, and pressing down the lever, the rake is raised, as seen in said Fig. 4.

The connection between the shaft D and the axle, by which the rake is lowered, we make by placing a slide, $c$, in proper guides $f$, and connect the said slide to the axle by a curved connecting-rod, $h$. As the shaft D is turned into the position seen in Fig. 3 the slide $c$ lifts upon the rod $h$ and holds the axle to bear upon the teeth $a$, as seen in said Fig. 3, or when borne down, as in Fig. 4, the slide $c$ bears down upon the said rod $h$, and is drawn from its guide $f$, and thus raises teeth. This connection operates the same, whether actuated by the hand-lever G or the foot-lever I. If by the foot-lever I, when in the position, as in Fig. 3, as bearing down the teeth, the lower end of the lever I bears against the slide $c$, and thus more strongly holds the teeth in that position.

L is a foot-lever having its fulcrum at $i$ upon an arm, M, projecting from the bar, to which the lever G is fixed, so that as the lever G turns from one position to the other the fulcrum of the said lever L is moved as from the position in Fig 5 to that in Fig. 6. The said lever L bears upon a roll, $n$, fixed to the axle A, so as to hold the teeth down, as in Fig. 5, or up, as in Fig. 6. The said lever L is operated by the other foot of the driver.

By moving the fulcrum of the lever L, as described, the power exerted is proportionately increased, so that when in the position as in Fig. 5 the greatest power is required and attained, and when, as at Fig. 6, the least power is required the least is attained. The lever G moves to thus change the fulcrum of the lever L whether the hand of the driver is applied to the said lever or only the foot to the lever I, owing to the connection F from the shaft D.

P is a socket formed as a brace for the thills C and cross-bars C'. (Seen in Fig. 2; shown enlarged in Figs. 7 and 8.)

$p$ is a mortise forming a socket to receive the lower end of a brace, R, of the seat S. The said braces spread from the seat downward, and the said mortises are inclined to correspond to the spread of the braces R, so that to place the braces R into the said mortises draw the two lower ends together, so that each brace will enter the mortise in its respective socket P, spreading as they are forced into the said mortises, securely holding the seat in its position.

To remove the seat simply withdraw the braces from their sockets.

Having therefore thus fully described our invention, what we claim as new and useful, and desire to secure by Letters Patent, is—

1. Combination of the slide $c$, the rod $h$, and axle A with the double-acting lever I, substantially as and for the purpose specified.

2. Combination of the slide $c$, the rod $h$, and axle A with the lever G, substantially as and for the purpose specified.

3. Combination of the lever L with the axle A, when arranged upon a movable fulcrum, and constructed so as to operate substantially as and for the purpose specified.

LYMAN CLINTON.
EZRA S. MUNSON.

Witnesses:
M. A. HINE,
JOHN H. SHUMWAY.